N. T. Judd,

Rotary Plow.

No. 109,741. Patented Nov. 29. 1870.

Witnesses:
J. C. Brecht.
Phil. T. Dodge.

Inventor:
Nelson T. Judd
by Dodge & Munn
Attys.

United States Patent Office.

NELSON T. JUDD, OF WASHINGTON, DISTRICT OF COLUMBIA.

Letters Patent No. 109,741, dated November 29, 1870.

IMPROVEMENT IN ROTARY PLOWS.

The Schedule referred to in these Letters Patent and making part of the same.

*To all whom it may concern:*

Be it known that I, NELSON T. JUDD, of Washington, in the county of Washington and District of Columbia, have invented certain Improvements in Rotary Plows, of which the following is a specification, reference being had to the accompanying drawing.

My invention relates to a series of plows attached to a rotating shaft, which is mounted in an adjustable wheeled frame, and operated by gearing connected with the main supporting-wheels of said frame.

Figure 1:
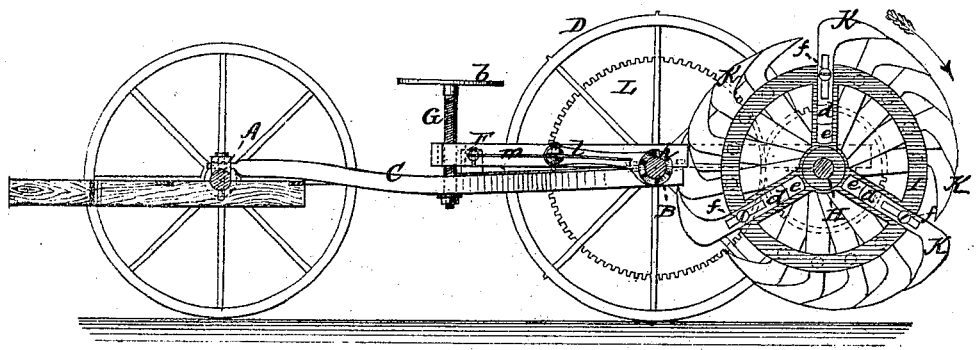
Figure 1 is a longitudinal vertical section of my plow, taken on the line $x$-$x$ of fig. 2.
Figure 2:
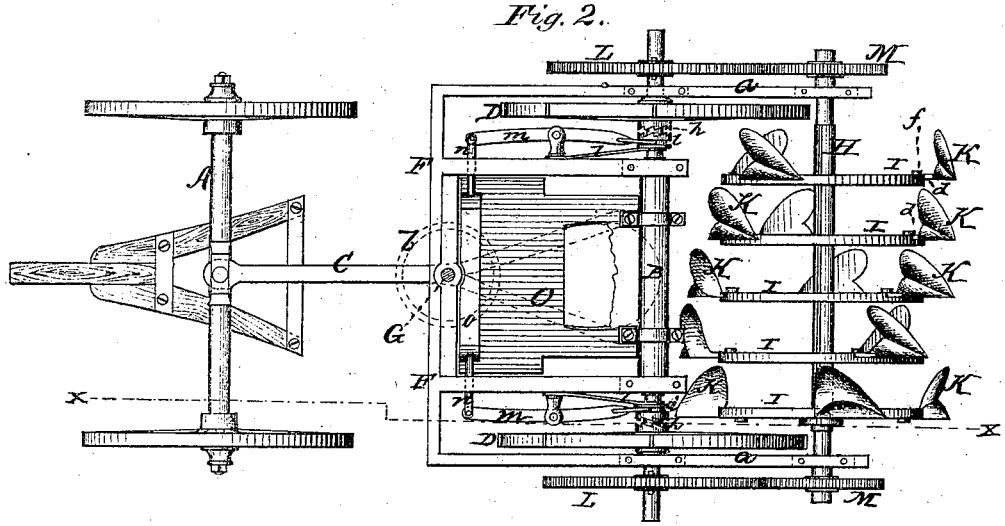
Figure 2 is a top plan view of the plow.
Figure 3:
Figure 3 is a part detached.

In proceeding to construct my plow, I first provide two shafts or axles, A and B, and mount them each on two wheels, and connect them by a suitable reach or frame, C, as shown in figs. 1 and 2.

The wheels D of the rear axle B I mount loosely thereon, so as to turn freely, and the axle itself I mount in boxes or bearings on the reach C, so as to turn freely therein. The front axle A I pivot to the reach, so as to turn or swing laterally in turning the machine about, and I connect to it, in suitable manner, a tongue, for attaching the horses.

On the rear axle B I mount a strong frame, F, which has on each side an arm, $a$, which projects out behind the axle, as shown in fig. 2.

This frame F I mount so as to tilt or vibrate freely on the axle, and through its front end I pass a vertical screw, G, which is provided on its upper end with a hand-wheel, $b$, and connected at its lower end to the reach-bar C, as shown in figs. 1 and 2.

By turning the hand-wheel $b$ the frame F is tilted or vibrated on the axle B, and the rear ends of the arms $a$ of the frame thrown up or down, according to the direction in which the screw is turned.

In the arms $a$ I mount a transverse shaft, H, and on this shaft secure a number of parallel wheels or disks, I, and to each of the wheels secure three plows, K, equidistant from each other.

The plows K I construct each with a slotted arm or standard, $d$, and in the wheels I, I make grooves, $e$, to receive said arms, which, after being inserted, are fastened by set-screws, $f$, so that the plows can be adjusted nearer to or further from the shaft, as occasion may require.

The plows are of such width and are so adjusted that each one cuts the whole space between the furrows of the adjoining plows on each side. Each plow I locate a little in advance of the next plow to the right on the adjoining wheel, so that, in the machine, there are three spiral rows of plows, each of which rows extends about one-third of the way around or about the shaft H.

On the inner side of the hub of each wheel D I form ratchet-teeth, $h$, and on the shaft B I mount sliding clutches, $i$, moving on splines or feathers on the shaft, and which may be thrown in and out of gear with teeth $h$, so that the driving-wheels will turn the shaft or not, as desired.

To the ends of shaft B I secure, rigidly, two cog-wheels, L, and to the ends of shaft H, pinions, M, which mesh with wheels L, as shown in fig. 2.

When the parts are thus arranged and the clutches engaged, the wheels D, in revolving, turn shaft B and its wheels L, and the latter operate pinions M, and rotate the shaft H and its plows in the direction shown in fig. 1 by the arrow.

To each side of the frame F I secure a spring, $l$, which bears against the inside of the corresponding clutch $i$, and tends to keep the same engaged with the teeth $h$.

I also pivot to each side of the frame a lever, $m$, which has its back end forked and inserted into a groove in the corresponding clutch, and its forward end pivoted to a horizontal sliding pin, $n$, which extends through the bar of the frame, as shown in fig. 2.

On the reach-bar C I secure a platform, O, and on the front end of the platform secure a bar, $o$, which has on each end a beveled head, $p$. These heads $p$ are so located, that, as the front end of frame F is depressed, the pins $n$ strike upon the heads, and are forced back by the same, so as to operate the levers $m$ and disengage the clutches $i$. When the front of the frame is again elevated so as to lift the pins $n$ from the inclined heads, the springs $l$ again throw the clutches into gear. Thus it will be seen that the clutches are automatically engaged when the front of the frame is raised, and disengaged when the same is depressed.

In operating the plow, the screw is turned so as to raise the front end of the frame, whereby the clutches are coupled, and the plows lowered. The machine is then drawn forward, when the plows are set in motion and caused to cut into the ground. The plows in each row operate in succession, and they are then followed, in like manner, by those in the next row. The plows, it will be seen, revolve forward, so that each plow is given a quick cut into the ground, and then carried forward and up, so as to lift and turn over the soil it has loosened. In this manner the series of plows serves to thoroughly break up and pulverize the soil, and leave it in a soft and mellow condition.

By arranging the plows as described, so as to cut in succession, I am enabled to operate the machine with a small expenditure of power, and, by the arrangement of the rows of plows, to cultivate a very wide strip of ground. By adjusting the screw G, the plows may be arranged to cut to any desired depth.

When the machine is in operation the wheels on one side run in the furrow, and, consequently, the plows on that side require to be set nearer the shaft H, as they would otherwise cut deeper than those on the opposite side.

When the plow is to be transported, as in going to or from the field, the screw is turned so as to depress the front end of frame F, and thereby throw the plows out of the ground, and disengage the clutches.

It is obvious that the plows may be detached from the wheels I, and their places filled by any other suitable tools or implements, so that the machine will answer, for instance, as a harrow or scarafier.

It is also obvious that, instead of using animal power for operating the machine, steam-power may be applied in any suitable manner.

Having thus fully described my invention,

What I claim is—

1. The frame F, pivoted centrally on the axle B, having a series of rotary plows mounted upon a transverse shaft at its rear end, and so arranged that, by adjusting its front end, the plows can be raised or lowered at will, substantially as described.

2. The arrangement of a series of gangs of rotary plows, substantially as described, whereby the plows of each gang may be adjusted to cut at any required depth, independently of the other gangs in the series, so that, while one side of the machine is lower than the other, the whole series of plows may be adjusted to cut at a uniform depth, as set forth.

4. The oscillating-frame F, having levers $m$, with their pins $n$ and springs $l$ attached thereto, in combination with the front frame or reach C, having the screw G and inclines $p$ thereon, and the sliding clutches $i$ and wheels D, with the clutches $h$, all arranged to operate as and for the purpose set forth.

NELSON T. JUDD.

Witnesses:
PHIL. T. DODGE,
W. C. DODGE,